United States Patent [19]

Godesberg

[11] Patent Number: 5,562,585

[45] Date of Patent: Oct. 8, 1996

[54] PROCESS FOR DISPOSAL OF ASBESTOS OR SUBSTANCES CONTAINING IT

[75] Inventor: Rolf Godesberg, Langelsheim, Germany

[73] Assignee: Karl-Heinrich Lemmerbrock, Aukrug, Germany

[21] Appl. No.: 302,933

[22] PCT Filed: Mar. 19, 1993

[86] PCT No.: PCT/EP93/00670

§ 371 Date: Nov. 28, 1994

§ 102(e) Date: Nov. 28, 1994

[87] PCT Pub. No.: WO93/18867

PCT Pub. Date: Sep. 30, 1993

[30] Foreign Application Priority Data

Mar. 23, 1992 [EP] European Pat. Off. .............. 92250068

[51] Int. Cl.$^6$ .................... A62D 3/00; B09B 3/00
[52] U.S. Cl. .................... 588/249; 405/128; 588/254
[58] Field of Search .................... 405/128, 129; 423/167.1, 331; 588/249, 254

[56] References Cited

U.S. PATENT DOCUMENTS

| | | | |
|---|---|---|---|
| 4,432,666 | 2/1984 | Frey et al. | 405/129 X |
| 4,818,143 | 4/1989 | Chou | 405/128 |
| 5,096,692 | 3/1992 | Ek | 423/331 X |
| 5,258,131 | 11/1993 | Mirick et al. | 588/254 X |
| 5,258,562 | 11/1993 | Mirick et al. | 588/254 X |

FOREIGN PATENT DOCUMENTS

| | | |
|---|---|---|
| 3728787 | 3/1989 | Germany . |
| 3914553 | 11/1990 | Germany . |
| 2-311381 | 12/1990 | Japan . |
| 8810234 | 12/1988 | WIPO . |
| 8906167 | 7/1989 | WIPO . |
| 9100123 | 1/1991 | WIPO . |

OTHER PUBLICATIONS

Kirk–Othmer, Encyclopedia of Chemical Technology, 1978, Wiley–Interscience, New York, US 3rd Edition, vol. 3, p. 272.

C. Wieker, "Chemische, electronenmikroskopische und rontgenographische Untersuchungen an Chrysotil–Asbest––Proben unter verschiedenen hydrothermalen Bedingungen in Gegenwart von Ca(OH)2", Silikattechnik, vol. 35, No. 5, 1984, Berlin DD, pp. 140–142.

*Primary Examiner*—George A. Suchfield
*Attorney, Agent, or Firm*—Fay, Sharpe, Beall, Fagan, Minnich & McKee

[57] ABSTRACT

In a process for disposal of asbestos or substances containing it, the initial material is converted by very fine grinding together with at least one material OH$^-$-ions in water in aqueous suspension into a material having non-fibrous stable mineral phases. In a non-hazardous manner therefore, asbestos is eliminated from the end product to be disposed of or otherwise used.

22 Claims, No Drawings

PROCESS FOR DISPOSAL OF ASBESTOS OR SUBSTANCES CONTAINING IT

BACKGROUND OF THE INVENTION

1. Field of the Invention

The invention relates to a method for the disposal of asbestos or materials containing asbestos, wherein the asbestos or materials containing asbestos are transformed by grinding into a material which comprises non-fibrous, stable, mineral phases.

2. Description of the Related Art

As is known, fine-fibrous asbestos aggregates such as serpentine asbestos (chrysotile) and amphibole asbestos cause tissues to become diseased, and in particular lung cancer. The safe disposal of asbestos or materials containing asbestos is, therefore, of great importance. At present the disposal of asbestos or materials containing asbestos takes place by dumping. If need be, the waste material is solidified with cement before it is dumped. A great disadvantage of this type of disposal is that a later release of asbestos into the environment cannot be excluded.

It is known, it is true, to treat asbestos thermally and/or chemically with acids to destroy its health-endangering fiber structure, and if need be to influence it mechanically. However, the known methods used for this require a relatively large amount of energy, a considerable outlay on equipment and/or relatively long treatment times. In particular, treatment parameters such as time and temperature must be very accurately adjusted relative to one another. There also exists a particular treatment relationship for the various types of asbestos. When comminuting asbestos, a health-endangering dust occurs, and with some chemical reactions waste gases occur that must be collected. As a result thereof, known methods, which are specified in greater detail below, have not proved successful in practice and do not permit the desired large-scale industrial application in a satisfactory manner. According to Kirk-Othmer, Encyclopaedia of Chemical Technology, 1978, Wiley-Interscience, New York, US, 3rd edition, vol. 3, p. 272, chrysotile is first subjected at high temperatures to a thermal decomposition to ensure a dehydroxylation, and then to an intensive grinding. From DE-A-3 914 553 it is known to sinter the fibres of chrysotile and crocidolite at relatively high sintering temperatures whilst at the same time influencing them mechanically. Some methods propose to treat asbestos with acids to dissolve the fiber structure (WO-A-8 906 167; WO-A-8 810 234) and if need be to heat it at the same time to high temperatures (DE-A-3 728 787) or to influence it mechanically (JP-A-2 311 381). According to WO-A-9 100 123 it is provided that moistened asbestos should be treated with a water-soluble mineralising agent, e.g. in particular borate, to transform it into a non-asbestos containing product. To this end, the asbestos may, if necessary, be shredded before the coarsely comminuted asbestos fragments are exposed to the mineralising agent.

SUMMARY OF THE INVENTION

In contrast thereto, it is the object of the invention to provide a technically simple method for the final and safe disposal of asbestos or materials containing asbestos which is suitable for all types of asbestos and can at a favourable cost be performed on an industrial scale, wherein the end product, which is to be dumped or used for other purposes, should no longer contain any asbestos.

According to the invention this object is achieved in that the grinding is carried out in the form of a pulverizing in an aqueous suspension, together with at least one substance which in water releases $OH^-$-ions. With this method the asbestos material is transformed into a material with mineral phases which differ from the mineral phase of the asbestos wherein the transformation is irreversible. As end product of the method a suspension of fine-crystalline and gel-like substances is obtained, which no longer have a fiber structure. The wet grinding according to the invention produces the transformation of the asbestos or the material containing asbestos in a relatively short time. After a grinding time of, for example, 30 minutes asbestos is no longer detectable with the X-ray diffractometer and the scanning electron microscope. It is also particularly advantageous that, because the method is carried out completely in an aqueous suspension, no dust formation can occur. This excludes an endangering of the personnel and the environment. Furthermore, it is very advantageous that no gaseous products are produced so that no waste gas problems occur.

The use of calcium hydroxide and/or an alkali hydroxide as substances that release $OH^-$-ions in water has proved particularly advantageous. It has also been found that the pulverizing in the aqueous suspension and the quick transformation of the crystal lattice structure of the asbestos starting material can be performed in a particularly favourable manner from a process engineering point of view when using a mixture consisting of calcium hydroxide and at least one other substance that releases $OH^-$-ions in water.

With regard to a very quick effective change of the asbestos crystal lattice structure, whereby as a result thereof at the same time chemical reactions are started up and completed, it has also been found that it is very advantageous when the mass ratio of the asbestos starting product to be transformed to the substance or substance mixture that releases $OH^-$-ions in water is about 1:1.

DESCRIPTION OF THE PREFERRED EMBODIMENT

According to a particularly expedient and very advantageous embodiment of the method according to the invention, the very fine ground product obtained in aqueous suspension is transferred to an autoclave, and is treated therein at an increased pressure and an increased temperature. The feeding of the autoclave with the aqueous suspension can, from a process engineering point of view, be performed in a particularly simple manner and permits a low hydrothermal autoclave process. This subsequent autoclave treatment of the suspension obtained from the grinding aids and speeds up the chemical transformation that already takes place in the suspension during the pulverizing. It has, in particular, been possible to transform amphibole asbestos, which is many time more health-endangering than chrysotile, into completely safe products in a relatively short time by means of the after-treatment in the autoclave. Excellent results of the autoclave process were obtained at temperatures of 250°–260° C. and corresponding pressures of about 40 bar. The treatment time can be in the range of a few minutes to a few hours, and in this example was about 30 minutes. Amphibole or chrysotile can no longer be detected with the X-ray diffractometer. Also no fibrous portions can be detected with the electron scanning microscope. Autoclave processes as such for the treatment of asbestos are known per se for the production of asbestos cement products (Silikattechnik, vol. 35, No. 5, 1984, Berlin DD, pages 140–142 C. Wieker "Chemische, elektronenmikroskopische und röntgenographische Untersuchungen an Chrysotil-Asbest-Proben"). The hydrothermal treatment of chrysotile in aqueous suspension in the presence of $Ca(OH)_2$ disclosed therein relates, as an essential difference from the invention, not to measures for the disposal of asbestos, but rather to analyses for the production of a chrysotile-cement mixture, wherein the health-endangering chrysotile fibers are not completely decomposed even after a treatment time of up to 13 days.

If one is willing to accept considerably longer treatment times, an embodiment of the method according to the invention with after-treatment also consists in that the suspension resulting from the grinding is fed to an open tank installation, in which the after-treatment of the suspension takes place unpressurized at boiling temperature.

For a more detailed explanation of the invention and the advantages that can be attained with same, in the following particularly suitable exemplified embodiments of the method according to the invention are described.

To perform the pulverizing according to the invention, pre-comminuted asbestos or pre-comminuted asbestos containing material together with water and at least one substance that releases $OH^-$-ions in water is supplied to a mill. Suitable grinding devices are mills which act on the material to be ground with a high grinding energy. During tests it was found that tube/drum mills, bead mills and vibration grinding mills meet this requirement particularly well. Particularly favourable grinding results are obtained with vibration grinding mills. The following examples are indicated:

A) 100 g of pure chrysotile asbestos is ground with 500 ml water and 100 g calcium hydroxide in a tube type vibration grinding mill for 30 minutes. The suspension is transferred to an autoclave and treated for 30 minutes at 260° C.

The obtained suspension is flowable. In the X-ray structure analysis chrysotile can no longer be detected. The scanning electron microscope image also shows no fibrous constituents.

B) 100 g of blue asbestos (crocidolite) are treated in the same manner as described in example A. In the end product, no mineral phases can be identified with the X-ray diffractometer, except for lines of Portlandite ($Ca(OH)_2$). The scanning electron microscope image shows no fibrous constituents.

C) 100 g of brown asbestos (amosite) are treated in the same way as in example A.

The results are the same as those of example B.

D) 100 g of asbestos-cement building material are treated in the same way as in example A.

The results are the same as those of example A.

E) 100 g of spraying asbestos are ground with 500 ml water and 100 g sodium hydroxide for 30 minutes. The suspension is treated in the autoclave for 30 minutes at 250° C. and 40 bar. No asbestos mineral phases can be detected with the X-ray diffractometer. Also no fibrous portions can be observed with the electron scanning microscope.

I claim:

1. A method for the disposal of an asbestos or material containing asbestos starting product, wherein the asbestos or asbestos containing materials are transformed by grinding into a ground product material which comprises non-fibrous, stable, mineral phases, wherein the grinding includes pulverizing asbestos or asbestos containing material in an aqueous suspension to which is added at least one substance which in water releases $OH^-$-ions.

2. A method according to claim 1, wherein at least one of calcium hydrozide and alkali hydroxide are used as substances that release $OH^-$-ions in water.

3. A method according to claim 1, wherein the pulverizing takes place together with a mixture which consists of calcium hydroxide and at least one other substance that releases $OH^-$-ions in water.

4. A method according to claim 1, wherein the ground product obtained in aqueous suspension is transferred to an autoclave and is treated therein at an increased pressure and increased temperature.

5. A method according to claim 1, wherein the starting product to be transformed consists of an amphibole asbestos and that the ground product obtained in aqueous suspension is transferred to an autoclave and is treated therein at an increased pressure and increased temperature.

6. A method according to claim 4, wherein the treatment time in the autoclave lies in the range from a few minutes to a few hours, and preferably around 30 minutes.

7. A method according to claim 1, further including boiling the ground product obtained in aqueous suspension.

8. A method according to claim 1, wherein the mass ratio of the asbestos starting product to the substance that releases $OH^-$-ions in water is about 1:1.

9. A method according to claim 2, wherein the pulverizing takes place together with a mixture which comprises of calcium hydroxide and at least one other substance that releases $OH^-$-ions in water.

10. A method according to claim 2, wherein the ground product obtained in aqueous suspension is transferred to an autoclave and is treated therein at an increased pressure and increased temperature.

11. A method according to claim 3, wherein the ground product obtained in aqueous suspension is transferred to an autoclave and is treated therein at an increased pressure and increased temperature.

12. A method according to claim 2, wherein the starting product to be transformed consists of an amphibole asbestos and that the ground product obtained in aqueous suspension is transferred to an autoclave and is treated therein at an increased pressure and increased temperature.

13. A method according to claim 3, wherein the starting product to be transformed consists of an amphibole asbestos and that the ground product obtained in aqueous suspension is transferred to an autoclave and is treated therein at an increased pressure and increased temperature.

14. A method according to claim 5, wherein the treatment time in the autoclave lies in the range from a few minutes to a few hours and preferably around 30 minutes.

15. A method according to claim 2, further including boiling the ground product obtained in aqueous suspension is subjected to an after-treatment unpressurized at boiling temperature.

16. A method according to claim 3, further including boiling the ground product obtained in aqueous suspension is subjected to an after-treatment unpressurized at boiling temperature.

17. A method according to claim 2, wherein the mass ratio of the asbestos starting product to be transformed to the substance or substance mixture that releases $OH^-$-ions in water is about 1:1.

18. A method according to claim 3, wherein the mass ratio of the asbestos starting product to be transformed to the substance or substance mixture that releases $OH^-$-ions in water is about 1:1.

19. A method according to claim 4, wherein the mass ratio of the asbestos starting product to be transformed to the substance or substance mixture that releases OH⁻-ions in water is about 1:1.

20. A method according to claim 5, wherein the mass ratio of the asbestos starting product to be transformed to the substance or substance mixture that releases OH⁻-ions in water is about 1:1.

21. A method according to claim 6, wherein the mass ratio of the asbestos starting product to be transformed to the substance or substance mixture that releases OH⁻-ions in water is about 1:1.

22. A method according to claim 7, wherein the mass ratio of the asbestos starting product to be transformed to the substance or substance mixture that releases OH⁻-ions in water is about 1:1.

* * * * *